United States Patent [19]
Cipolla et al.

[11] Patent Number: 5,881,319
[45] Date of Patent: Mar. 9, 1999

[54] SHUTTER RELEASE BUTTON WITH INTEGRAL CANTILEVERED SUPPORT FOR BRAKING ROTATABLE FILM SPROCKET TO PREVENT FILM MOVEMENT DURING EXPOSURE

[75] Inventors: David Cipolla, Pittsford; Jeffrey A. Solomon, Spencerport, both of N.Y.

[73] Assignee: Eastman Kodak Company, Rochester, N.Y.

[21] Appl. No.: 3,313

[22] Filed: Jan. 6, 1998

[51] Int. Cl.⁶ .......................... G03B 17/02; G03B 17/00; G03B 17/38
[52] U.S. Cl. .............................. 396/6; 396/395; 396/440; 396/502
[58] Field of Search ................................ 396/6, 395, 396, 396/440, 502, 503, 543

[56] References Cited

U.S. PATENT DOCUMENTS

| | | | |
|---|---|---|---|
| 4,290,676 | 9/1981 | Hozman et al. ........................ | 396/440 |
| 5,510,866 | 4/1996 | Solomon et al. ........................ | 396/395 |
| 5,521,669 | 5/1996 | Kamata ................................... | 396/401 |
| 5,614,975 | 3/1997 | Sangregory et al. .................... | 396/396 |
| 5,634,160 | 5/1997 | Lee ......................................... | 396/395 |
| 5,644,378 | 7/1997 | Boyd ...................................... | 396/284 |
| 5,758,197 | 5/1998 | Cipolla et al. .............................. | 396/6 |

*Primary Examiner*—Eddie C. Lee
*Attorney, Agent, or Firm*—Roger A. Fields

[57] ABSTRACT

A camera mechanism comprising a manually depressible shutter release button, a resilient cantilevered support for the shutter release button which is moved when the shutter release button is manually depressed, and a rotatable sprocket for engaging a filmstrip, is characterized in that the sprocket has a spindle that rotates with the sprocket, and the cantilevered support has a bearing hole in which spindle is rotated, to allow the cantilevered support to be moved firmly against the spindle to brake the film sprocket when the shutter release button is manually depressed.

2 Claims, 2 Drawing Sheets

SHUTTER RELEASE BUTTON WITH INTEGRAL CANTILEVERED SUPPORT FOR BRAKING ROTATABLE FILM SPROCKET TO PREVENT FILM MOVEMENT DURING EXPOSURE

FIELD OF THE INVENTION

The invention relates generally to the field of photography, and in particular to cameras. More specifically, the invention relates to a device for preventing film movement during exposure in a camera.

BACKGROUND OF THE INVENTION

Film and cameras that are all in one, commonly referred to as single-use or one-time-use cameras, have become well known. Typically, the one-time-use camera is a simple point-and-shoot type comprising a plastic main body part which supports a conventional film cartridge in a cartridge receiving chamber, a film take-up spool in a film supply chamber, a fixed-focus taking lens, a film metering mechanism with a rotatably supported metering sprocket that engages successive sections of the filmstrip at a backframe (exposure) opening, a manually rotatable thumbwheel rotatably engaged with a film spool inside the film cartridge, a single-blade shutter, a manually depressible shutter release button, a resilient cantilevered support for the shutter release button, a rotatable frame counter for indicating the number of exposures remaining to be made on the filmstrip, a direct see-through viewfinder, and in some models an electronic flash. A pair of plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound off the take-up spool and into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer. At least some of the used camera parts may be recycled, i.e. reused, to remanufacture the camera.

Prior Art Problem

Manually depressing the shutter release button to take another picture in the one-time-use camera pivots the metering lever out of engagement with the thumbwheel. This is done to permit rotation of the thumbwheel after the shutter blade is closed, in order to wind an exposed section of the filmstrip into the film cartridge. However, when the metering lever is pivoted out of engagement with the thumbwheel, the film section to be exposed can undergo some slight movement before the shutter blade is closed, because the metering sprocket though engaged with the film section is not rotatably constrained. If the film section is moved during exposure, the resulting picture will be blurred.

Prior art U.S. Pat. No. 5,614,975 issued Mar. 25, 1997 discusses this problem and offers as a solution that a brake be applied to the manually rotatable thumbwheel to prevent film movement, when the shutter release button is manually depressed. Prior art U.S. Pat. No. 5,534,160 issued May 27, 1997 similarly suggests that a motor-driven equivalent of the thumbwheel be braked when the shutter release button is manually depressed. However, in each of the patents, the metering sprocket is free to rotate in engagement with the film section to be exposed. Since the metering sprocket is typically positioned adjacent the backframe opening at which the film section is exposed, the problem may persist.

SUMMARY OF THE INVENTION

A camera mechanism comprising a manually depressible shutter release button, a resilient cantilevered support for the shutter release button which is moved when the shutter release button is manually depressed, and a rotatable sprocket for engaging a filmstrip, is characterized in that:

the sprocket has a spindle that rotates with the sprocket; and the cantilevered support has a bearing hole in which spindle is rotated, to allow the cantilevered support to be moved firmly against the spindle to brake the film sprocket when the shutter release button is manually depressed.

DETAILED DESCRIPTION OF THE INVENTION

Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
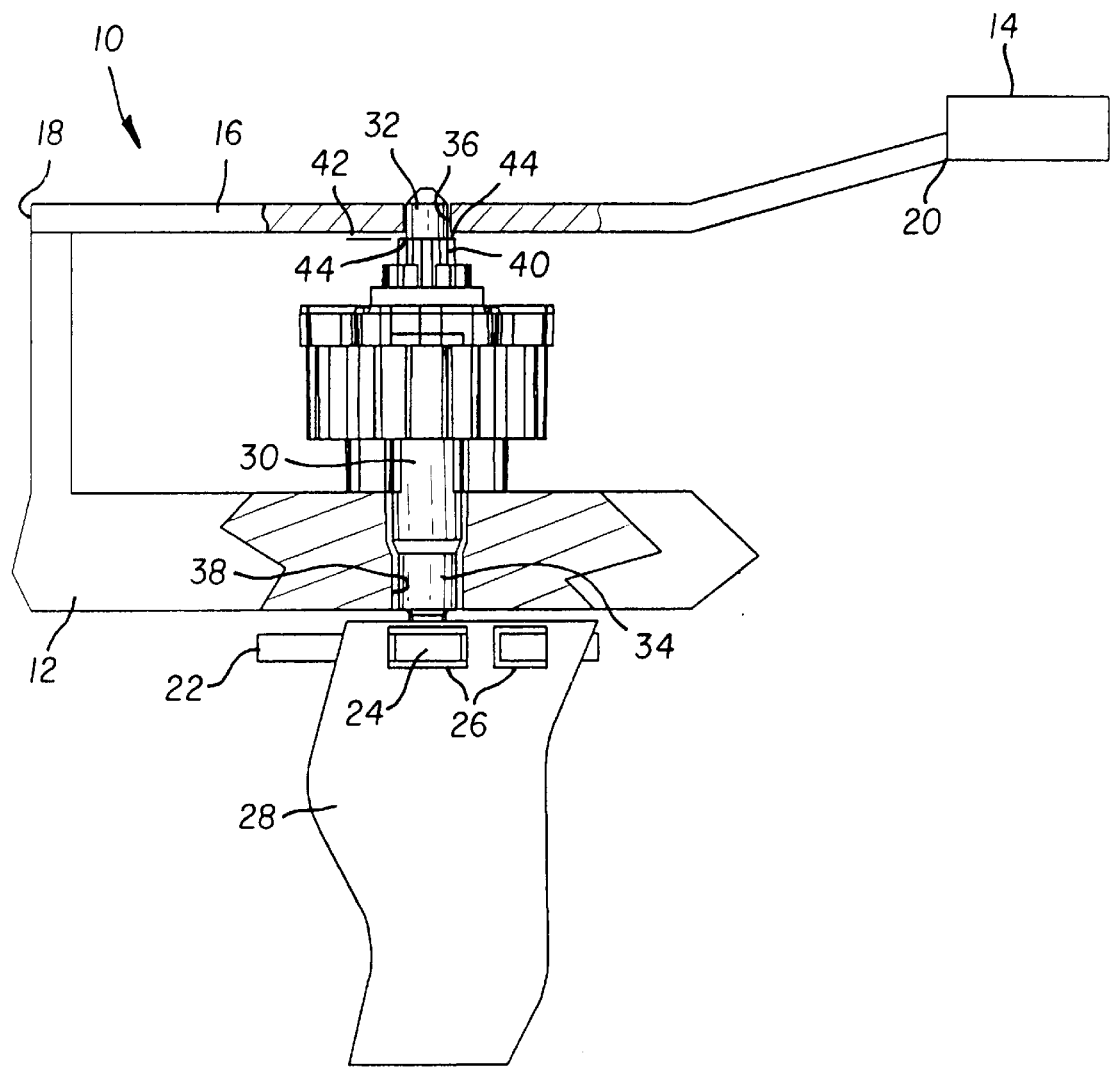
FIG. 1 is an elevation view of a shutter release button with an integral cantilevered support for braking a rotatable sprocket to prevent film movement during exposure, according to a preferred embodiment of the invention.
Figure 2:
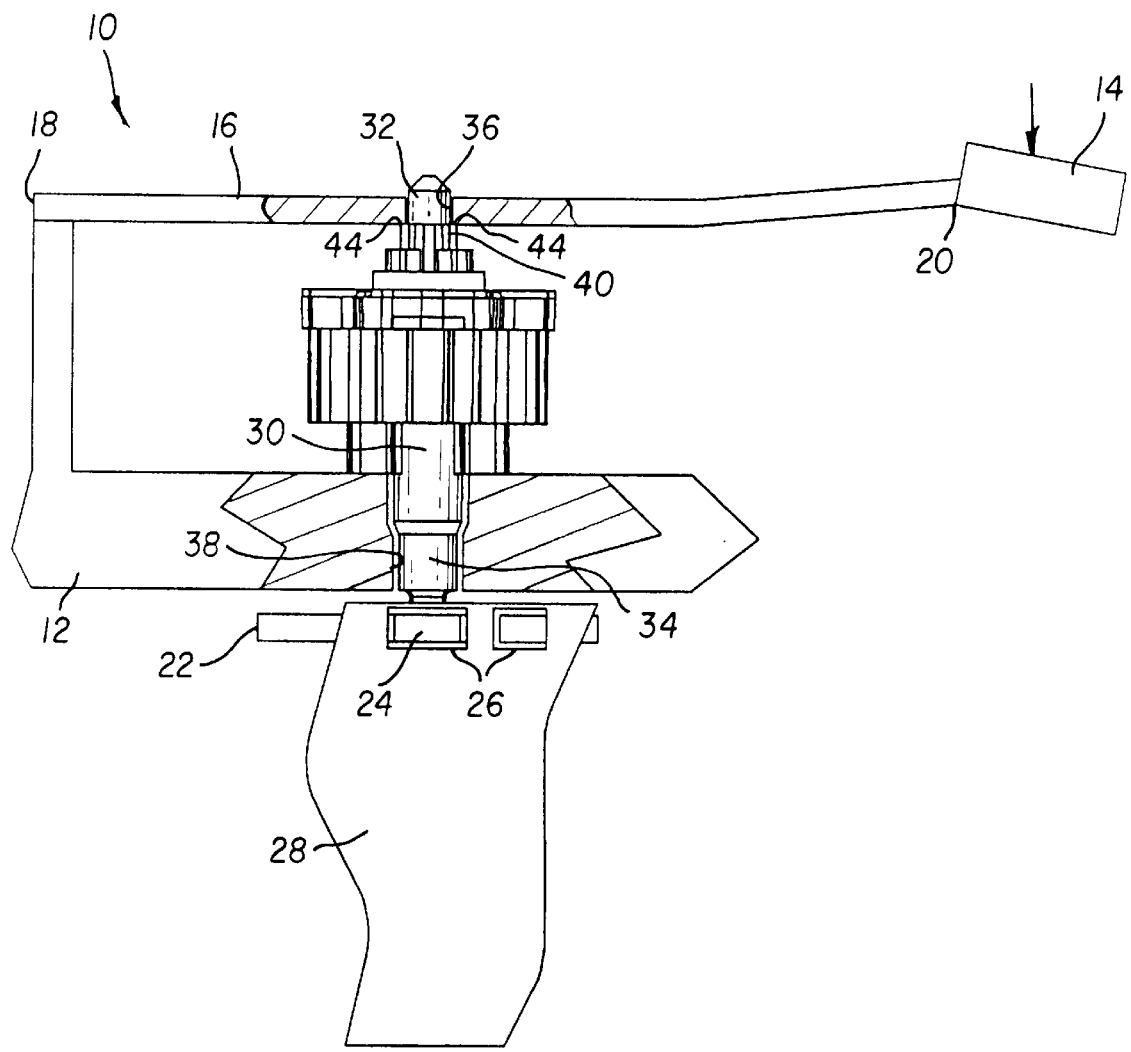
FIG. 2 is an elevation view similar to FIG. 1, showing the shutter release button manually depressed to take a picture and the cantilevered support braking the film sprocket.

Referring now to the drawings, FIGS. 1 and 2 show a camera mechanism 10 comprising a partially shown main body part 12, a manually depressible shutter release button 14, and a resilient cantilevered support 16 for the shutter release button. The cantilevered support 16 has one end 18 fixed to the main body part 12 and the other end 20 integrally joined with the shutter release button 14 to be freely suspended in space.

A metering sprocket 22 has several teeth 24 for being received in respective perforations 26 in successive film sections 28 to be exposed at a backframe opening (not shown). The sprocket 22 is positioned adjacent the backframe opening and is provided with an integrally formed spindle 30. The spindle 30 has opposite end portions 32 and 34 rotatably supported in respective bearing holes 36 and 38 in the cantilevered support 16 and the main body part 12, and a radial projection 40 positioned immediately beneath the cantilevered support to be adjacent the bearing hole in the cantilevered support. A slight space 42 is shown in FIG. 1 between the cantilevered support 16 and a shoulder 44 of the radial projection 40.

When the shutter release button 14 is manually depressed as shown in FIG. 2, the cantilevered support is pressed against the shoulder 44 of the radial projection 40 to firmly brake the spindle 30 and, thus, the sprocket 22. As a result, the sprocket 22 is prevented from being rotated to, in turn, prevent movement of the film section 28 at the backframe opening during exposure.

The invention has been described with reference to a preferred embodiment. However, it will be appreciated that variations and modifications can be effected by a person of ordinary skill in the art without departing from the scope of the invention.

PARTS LIST 10. camera mechanism
12. main body part
14. shutter release button
16. cantilevered support
18. fixed end
20. free end
22. sprocket
24. teeth
26. film perforations
28. film section
30. spindle
32. end portion
34. end portion
36. bearing hole
38. bearing hole
40. radial projection
42. slight space
44. shoulder

What is claimed is:

1. A camera mechanism comprising a manually depressible shutter release button, a resilient cantilevered support for said shutter release button which is moved when the shutter release button is manually depressed, and a rotatable sprocket for engaging a filmstrip, is characterized in that:

said sprocket has a spindle that rotates with the sprocket; and said cantilevered support has a bearing hole in which said spindle is rotated, to allow the cantilevered support to be moved firmly against the spindle to brake said film sprocket when said shutter release button is manually depressed.

2. A camera mechanism as recited in claim 1, wherein said spindle has a projection that is positioned immediately beneath said cantilevered support and adjacent said bearing hole to allow the cantilevered support to be pressed against said projection to brake said sprocket when said shutter release button is manually depressed.

* * * * *